United States Patent [19]

Weaver

[11] 4,370,084
[45] Jan. 25, 1983

[54] POWDER UNLOADING APPARATUS

[75] Inventor: Robert F. Weaver, Stevens Point, Wis.

[73] Assignee: Foremost-McKesson, Inc., San Francisco, Calif.

[21] Appl. No.: 244,007

[22] Filed: Mar. 16, 1981

[51] Int. Cl.³ .............................................. B65G 67/06
[52] U.S. Cl. .................................... 414/292; 414/328; 414/495; 414/528
[58] Field of Search ................ 198/821, 481; 222/461; 414/291, 292, 328, 495, 528

[56] References Cited

U.S. PATENT DOCUMENTS

| 1,434,488 | 11/1922 | Forsythe | 414/328 |
| 2,890,803 | 6/1959 | Vanier | 414/292 |
| 3,985,245 | 10/1976 | Schulte | 414/291 |

Primary Examiner—Richard A. Schacher
Attorney, Agent, or Firm—Flehr, Hohbach, Test, Albritton & Herbert

[57] ABSTRACT

An apparatus is provided for unloading material in powder form. A powder chamber is provided, with a lower sealing area. An enclosed housing is located beneath the chamber, and includes an endless belt and an upwardly facing sealing area which is complimentary to the sealing area of the powder chamber.

4 Claims, 12 Drawing Figures

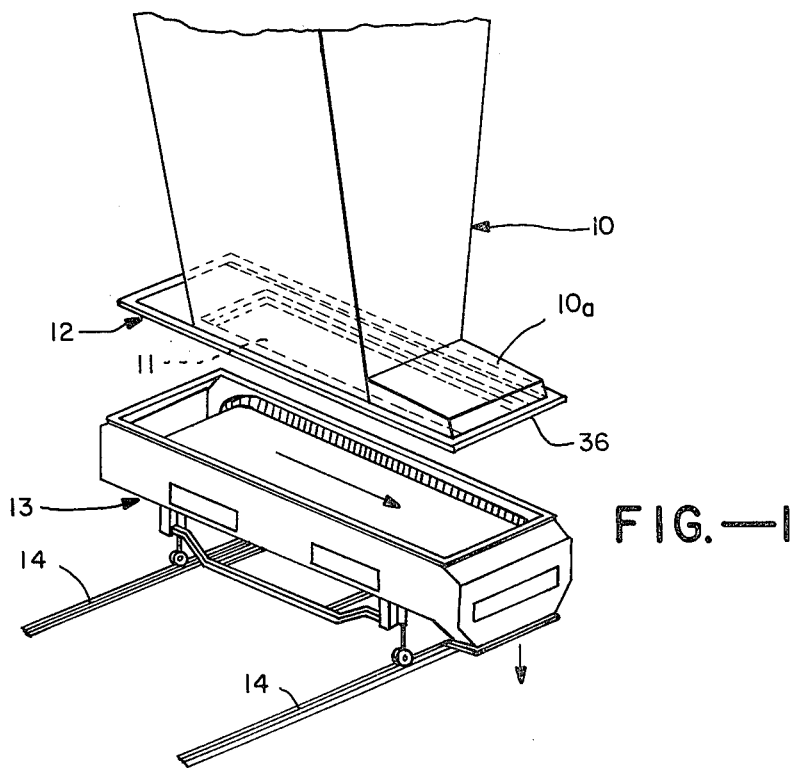
FIG.—1
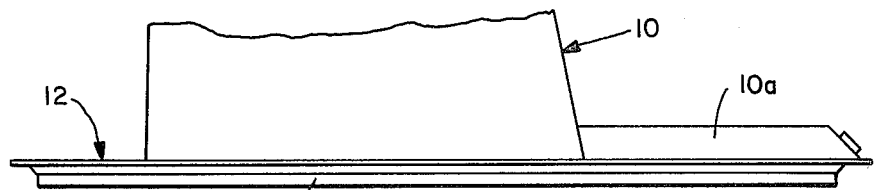
FIG.—2
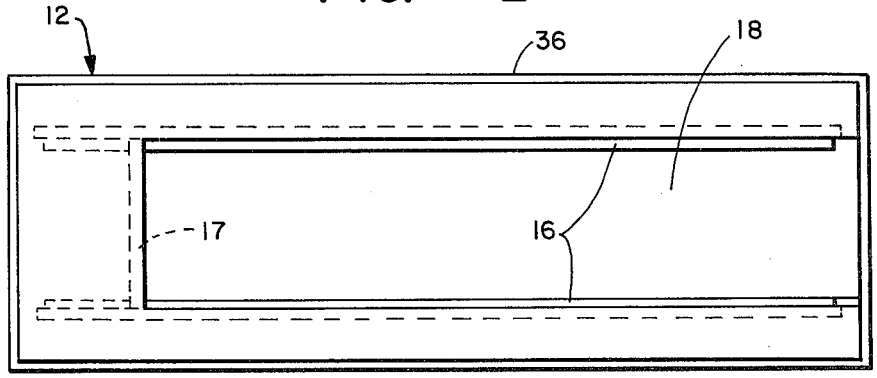
FIG.—3

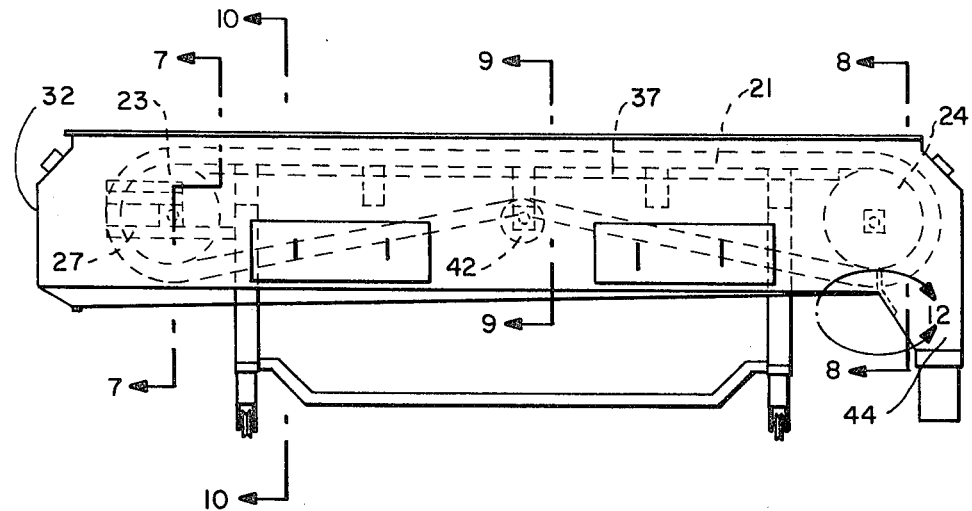
FIG.—4
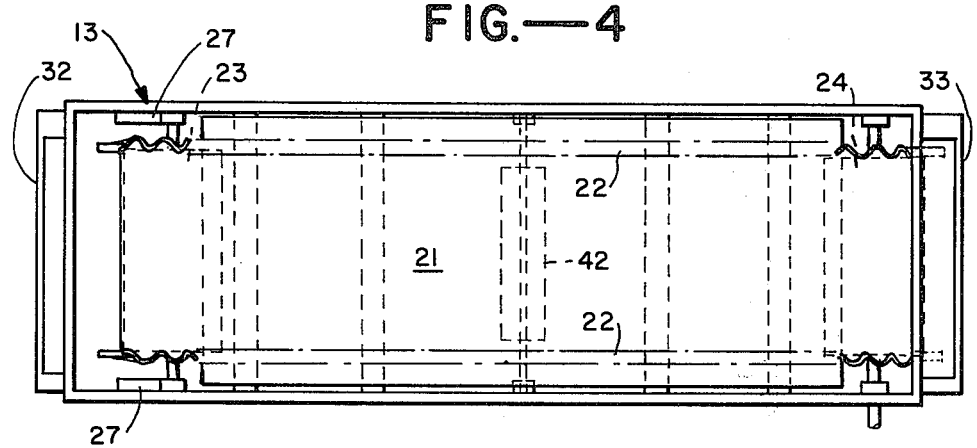
FIG.—5
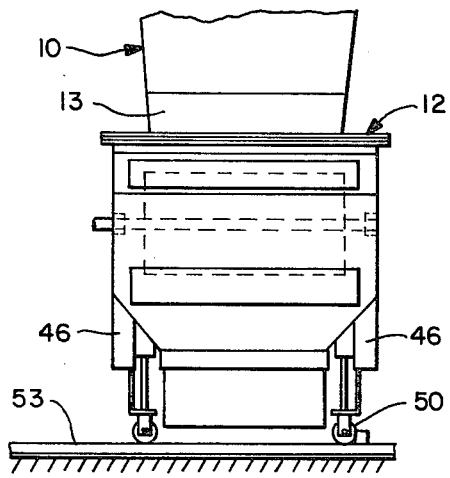
FIG.—6

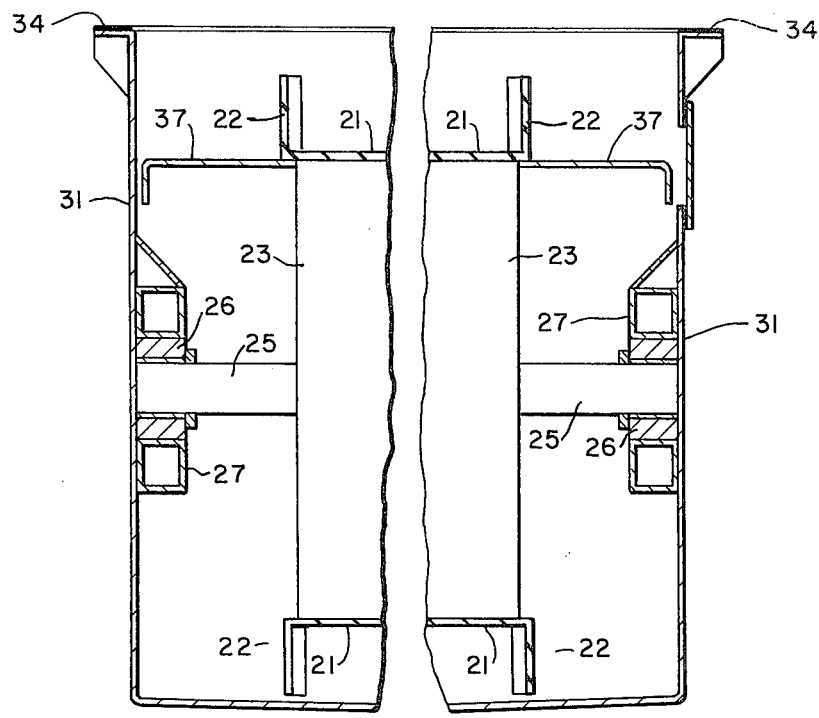
FIG.—7
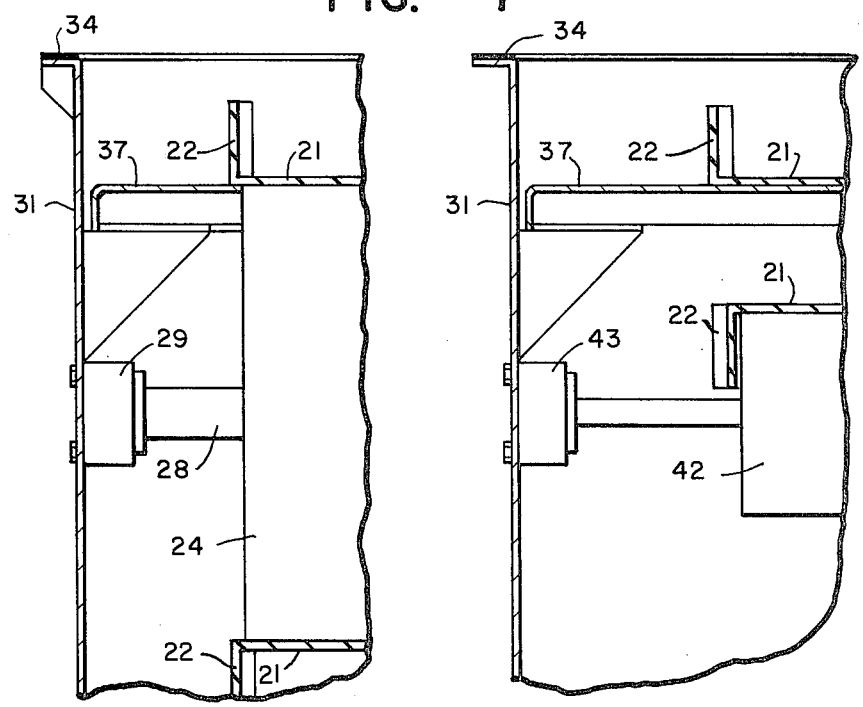
FIG.—8    FIG.—9

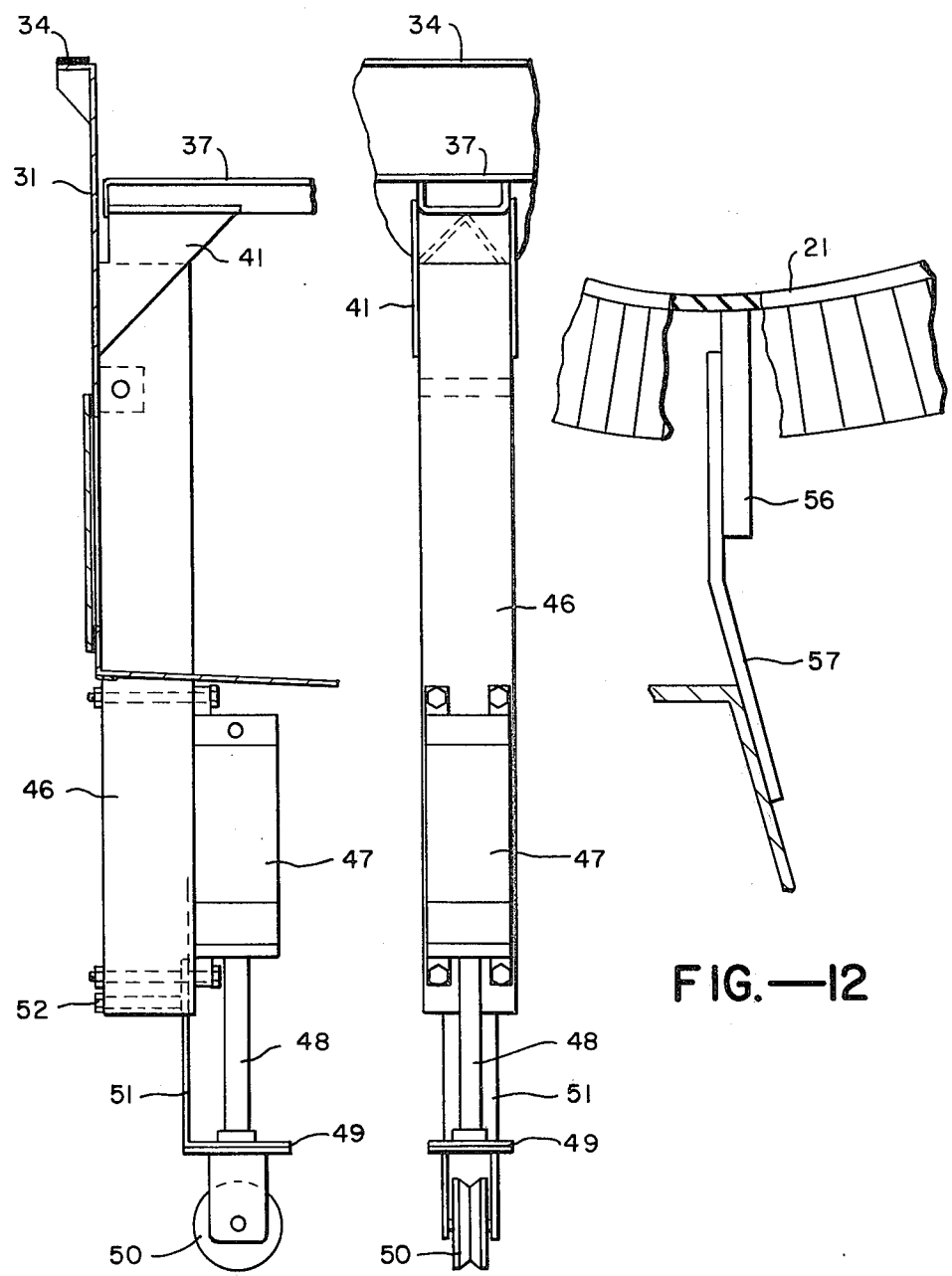
FIG.—10  FIG.—11  FIG.—12

POWDER UNLOADING APPARATUS

This invention relates generally to apparatus for unloading material in powder form from chambers or conduits in which the powder is being formed or is being processed or handled. It is particularly applicable for controlling the unloading of dry powder from spray dryers.

In the operation of spray dryers such as are used in the dairy industry for producing dry milk products in powder form, various devices have been attached to the lower end of the dryer chamber for effecting controlled discharge of the powder. Apparatus that has been used for this purpose include devices of the rotary paddle type, devices making use of rollers forming a roller bed, and apparatus making use of an endless belt for conveying and removing the powder as it falls from the spray dryer. All of these devices tend to restrict entrance of some atmospheric air into the spray dryer, but they do not perform equally well under conditions of both negative and positive pressure within the dryer chamber. In addition prior equipment has been difficult to clean and the use has not been approved by the United States Department of Agriculture standard. Since they do not provide an effective atmospheric seal the product being handled is subject to airborne bacteria or contamination.

It is an object of the present invention to provide an improved powder unloading apparatus which will overcome the defects and deficiencies of prior devices.

Another object of the invention is to provide an improved powder loading device which when used in connection with spray dryers makes possible proper operation under either positive or negative pressure conditions within the dryer chamber.

Another object of the invention is to provide an unloading apparatus which will provide an effective seal against the product being subjected to airborne bacteria or contamination.

Another object is to provide an unloading apparatus which can be readily cleaned and maintained in sanitary conditions.

The present invention employs a seal plate that is secured to the lower open end of a chamber, such as the chamber of a spray dryer. The seal plate provides an opening and free communication with the downwardly faced opening of the chamber. A peripheral margin of the seal plate forms a downwardly faced sealing area. An assembly unit is adapted to be positioned below the seal plate, and consists of a closed housing comprising side, end and bottom walls. The side and end walls surround an upwardly faced opening of the housing, and the upper edges of these walls have margins forming an upwardly faced planar sealing area that is complimentary to the sealing area of the seal plate. An endless conveyor belt is disposed within the housing, and the belt is mounted whereby its upper run extends in a plane parallel and contiguous to the upwardly faced sealing area of the housing. Pulleys are provided within the housing and adjacent the ends of the same about which the ends of the belt are looped. The belt is adapted to be driven whereby its upper run traverses across the upwardly faced opening of the housing toward one end of the same. Means at that one end of the housing forms a downwardly extending discharge passage. A flat supporting plate within the housing directly underlies and is in contact with the upper run of the belt. Means are provided for elevating or lowering the unit relative to the chamber and to the seal plate, the unit when elevated having its sealing area pressed into sealing engagement with the sealing area of the seal plate. When lowered the unit can be moved to one side to facilitate cleaning.

Additional objects and features of the invention will appear from the following description in which the preferred embodiment is illustrated in detail in conjunction with the accompanying drawing.

FIG. 1 is a schematic view in perspective illustrating the present invention.

FIG. 2 is a side elevational view of the seal plate, showing its application to the lower end of a spray dryer chamber.

FIG. 3 is a plan view of the seal plate, before being attached to a dryer chamber.

FIG. 4 is a side elevational view of the assembly unit that is adapted to be raised into sealing engagement with the seal plate.

FIG. 5 is a plan view of the unit shown in FIG. 4.

FIG. 6 is an end view of the unit shown in FIGS. 4 and 5, with the unit in operating position with respect to the lower end of a spray dryer.

FIG. 7 is a cross-sectional view taken along the line 77 of FIG. 4, on an enlarged scale.

FIG. 8 is a fragmentary cross-sectional view taken along the line 88 of FIG. 4.

FIG. 9 is a cross-sectional view taken along the line 99 of FIG. 4.

FIG. 10 is a detail in section illustrating a part of the means for supporting and for elevating or lowering the unit relative to the seal plate.

FIG. 11 is a side view of FIG. 10.

FIG. 12 is a detail in section taken as indicated in FIG. 4, showing scraper means for removing powder from the conveyor belt.

Referring to FIG. 1 of the drawing, the structure 10 represents the lower part of a spray dryer chamber. The main part of a spray dryer chamber is generally cylindrical, and the lower part converges downwardly somewhat as indicated in FIG. 1. The powder accumulating in the lower part of the dryer chamber falls by gravity to the downwardly faced opening 11. According to the present invention the lower end of the dryer chamber is provided with the seal plate 12, and in addition an extension or hood 10a is provided.

The seal plate 12 is adapted to be placed in cooperative relationship with an underlying assembly unit 13. This unit is preferably supported on rails 14 whereby when in lowered position, it can be moved to one side to facilitate cleaning or repairs.

As illustrated in FIGS. 2 and 3 the seal plate is provided with two parallel longitudinally extending ribs 16, which at the left end of the seal plate as illustrated in FIGS. 2 and 3, is joined by a rib 17. The opening 18 through the seal plate has substantially the same dimensions as the opening at the bottom of the spray dryer structure 10, although the seal plate opening extends beneath the hood 13.

Within the housing, which is closed except for its upper side and the passage though which powder is discharged, there is a belt 21 which is made of suitable flexible material, such as fabric reinforced synthetic rubber. The sides of the belt preferably are provided with retainer ribs 22, which may be formed integral with the main body of the belt. Preferably these retainer ribs are pleated or otherwise formed to facilitate their extension and contraction as is required for passing over supporting pulleys. Pulleys 23 and 24 are mounted within the end portions of the housing, and are engaged by the end loops of the belt. The shaft 24 which carries pulley 23 is carried by journal blocks 23, that is adjustable within the slide 27. The shaft 28, which carries the pulley 24, is journaled by bearings 29 mounted upon the side walls of the housing.

The upper margins of the side walls 31 of the housing, together with the end walls 32 and 33 are formed to provide a rectangular sealing area 34. This has the same configuration and dimensions as sealing area 36 formed about the perimeter of the seal plate 12. In other words the sealing areas 34 and 36 are complimentary, and form a complete seal when the two areas are pressed together. One or both of these areas is provided with a sealing gasket made of suitable resilient sealing material, such as fabric reinforced synthetic rubber.

The upper run of the belt rides upon the upper surface of a support plate 37 (FIGS. 10, 11). This plate is supported by cross bars 40 which have their ends secured to the side walls 31 of the housing by brackets 41. The upper surface of the plate 37 is planar and has direct supporting contact with the lower surface of the belt. The lower run of the belt is supported by the Idler Pulley 42, which is journaled in suitable bearings 43 carried by the side walls 31.

The right hand end of the housing as shown in FIGS. 4 and 5 is provided with a portion 44 forming a discharge passage way. In practice this passage is connected by conduit with additional closed processing equipment, as for example a secondary dryer or cooler.

As previously mentioned, in a plant installation the unit 13 is carried by means which permits it to be raised or lowered relative to the seal plate 12, and be moved to one side after being lowered. For this purpose hollow legs 46 (FIGS. 10, 11) are secured to the housing, and each leg serves to mount a pneumatic cylinder-piston assembly 47. The piston rod 48 of each of these assemblies is secured to mounting means 49 for a grooved supporting wheel 50. The mounting means also connects to a member 51, which slidably extends into the corresponding hollow member 46 and may be fixed to the leg by a clamping screw 52. Each of the cylinder-piston assemblies 49 is connected to a pneumatic system whereby air under pressure can be applied to either elevate or lower the unloading unit. In FIG. 3 the grooved wheels 51 are shown engaging the rails 53 whereby when the unloading unit is lowered, the entire assembly can be moved to one side of the spray dryer to facilitate cleaning or repairs.

FIG. 12 illustrates suitable scraper means which may be provided for insuring removal of powder from the belt at the discharge end of the unit. It consists of a scraper or wiper bar 56 which can be made of suitable plastic material such as teflon, which is carried by bracket member 57.

Operation of the apparatus described above is as follows:

Assuming that the apparatus is used in conjunction with a spray dryer which is producing dry milk powder, the unloading unit 13 is raised and locked into the sealing position illustrated in FIG. 6. This serves to form a complete seal between the seal plate and the housing of the unit 13, and assuming that the discharge passage is directly coupled to closed auxilliary processing equipment, substantially no atmospheric air may enter the housing. The belt is driven by a suitable motor, either electric or hydraulic, which can be accurately controlled with respect to the driving speed. The motor may for example be coupled to the projecting end of shaft 28. Because of the fixed support afforded by the plate 37, the upper run of the belt 21 cannot flex downwardly, and sufficient belt tension is applied to prevent upward flexing away from the plate. The ribs 16 and 17 are disposed with their lower edges directly overlying and in proximity with the upper surface of the belt. Powder from the spray dryer chamber falls downwardly by gravity and is distributed upon the upper run of the belt, between the retaining ribs 16. This confines the depositing powder to the upper surface of the belt, thus avoiding delivering any substantial amount of powder to other portions of the housing. At the discharging end of the housing the accumulated powder layer is delivered downwardly through the discharge passage way and any powder remaining on the belt is removed by the scraper or wiper 56. At the end of a production run the unit 12 is lowered and moved to one side, where it can be repaired or cleaned. Cleaning is a relatively simple operation because of the fact that the powder is confined to the upper run of the belt, and does not find its way into other portions of the housing.

It is well known that equipment of the spray dryer type generally operates under positive pressure, but at times may operate under negative pressure. Also under certain conditions the pressure within the drying chamber may vary from positive to negative. Such changes do not effect the operation of unit 13, and when the pressure in the dryer is negative, no substantial amount of atmospheric air is drawn into the spray dryer by way of the unloading unit. The apparatus is not subject to blow-outs, such as are relatively common with prior art forms of unloaders. This is because of the sealed relationship between the dryer and the unloading unit, and the manner in which the powder is confined as it is deposited upon the belt 21.

Depending upon structural features, it may be desirable to provide supplemental clamping means for insuring adequate clamping forces between the seal plate and the housing. Conventional clamping devices may be used for this purpose which apply clamping forces between the sides of the housing and the outer margin of the seal plate.

What is claimed is:

1. Apparatus for effecting discharge of a powder from a chamber containing the same, the chamber having a downwardly extending part at its lower end which provides a downwardly faced opening, a seal plate secured to the lower end of said part, the plate having an opening in free communication with the opening of the chamber part, said plate having a margin forming a downwardly faced sealing area, an assembly unit adapted to cooperate with the sealing plate, the unit comprising a closed housing having side and end walls surrounding an upperly faced opening and having upper margins forming an upwardly faced sealing area surrounding the opening of the housing and which is complimentary to the first named sealing area, an endless belt disposed within the housing, means for mounting the belt whereby its upper run extends in a plane parallel and contiguous to said upperly faced sealing area, pulleys within the housing adjacent the ends of the same about which the belt is looped, said belt being adapted to be driven whereby the upper run of the same traverses across the upwardly faced opening of the housing in a direction toward one discharge end of the housing, means at said discharge end of the housing forming a downwardly extending powder discharge passage, and means for elevating or lowering the assembly unit relative to said chamber, the unit when elevated having its sealing area pressed into sealing engagement with the sealing area of the seal plate.

2. Apparatus as in claim 1 in which a plate is secured within the housing and disposed with its upper surface in direct contact with the lower surface of the upper run of the belt, said plate being dimensioned to extend over an area corresponding to the area of the opening in the seal plate.

3. Apparatus as in claim 1 together with a downwardly extending ribs secured to the lower side of the seal plate, said ribs extending from that end of the opening in the seal plate that is adjacent to the discharge end of the housing, to the other end of the opening in the seal plate, the lower edge of the ribs being coincident with a plane and being disposed in proximity with the upper surface of the upper run of the belt.

4. Apparatus as in claim 3 in which the belt has flexible retainer ribs on its side edges, the ribs on the seal plate being within the ribs on the belt.

* * * * *